Nov. 12, 1963  C. D. CURRY, JR  3,110,412
COOKING UTENSIL COVER
Filed May 2, 1963
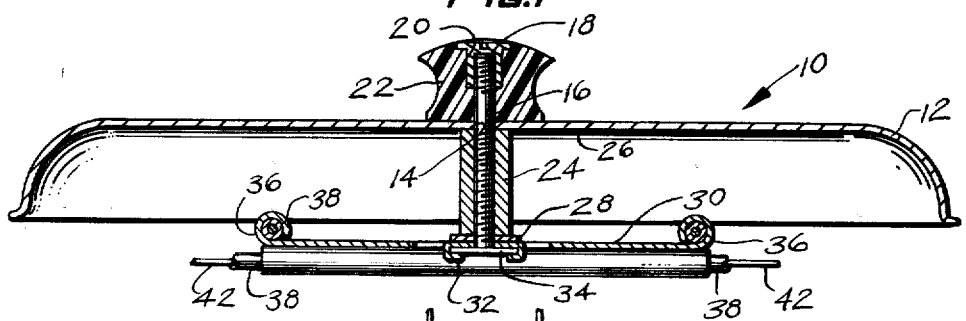
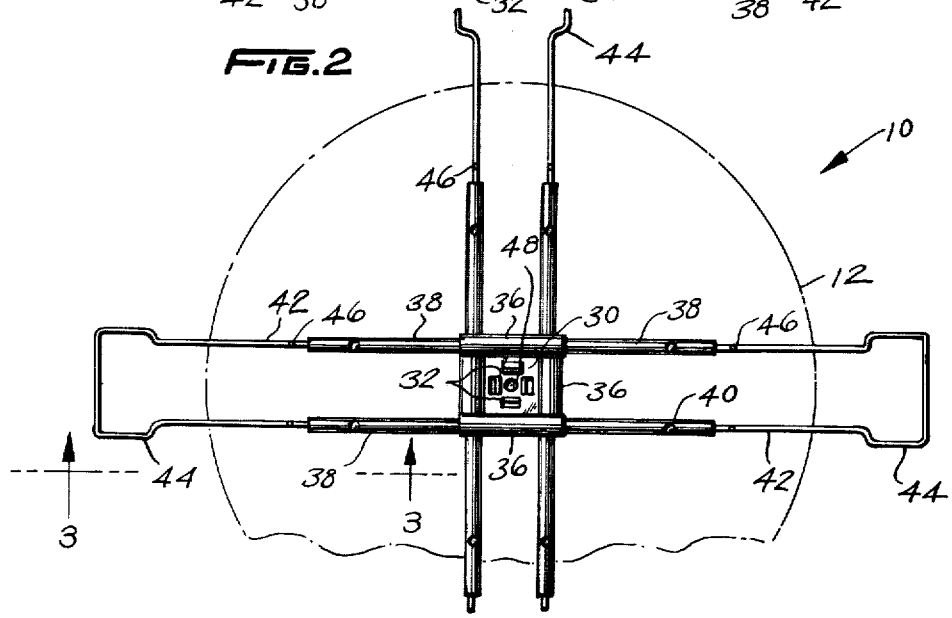
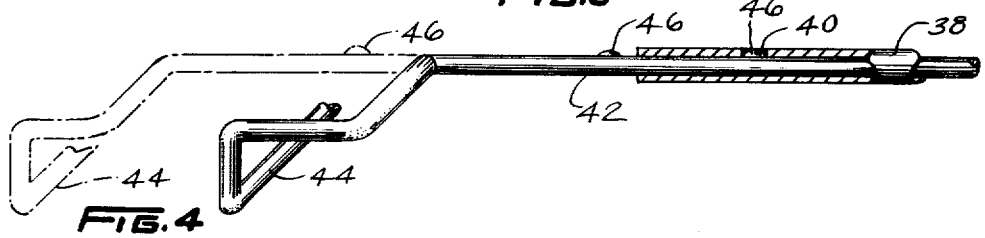
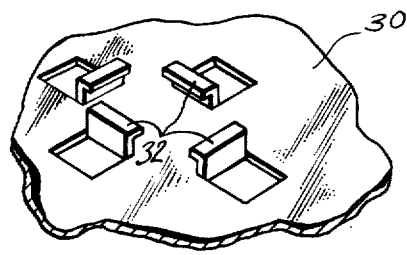
INVENTOR.
CHARLES D. CURRY, JR.

United States Patent Office 3,110,412
Patented Nov. 12, 1963

3,110,412
COOKING UTENSIL COVER
Charles D. Curry, Jr., 507 3rd Ave., Box 1127,
Seattle 4, Wash.
Filed May 2, 1963, Ser. No. 277,598
7 Claims. (Cl. 220—44)

This invention relates to an improved cover for cooking utensils and the like.

It is a primary object of the present invention to provide a cooking utensil cover which will shorten cooking time and will add to the nutritional value of meats, fish, and foods through the scientific use of steam.

Another object of the present invention is to provide a cooking utensil cover which will be essential in preparing foods both in the household and in the professional preparation of foods, meats and fish.

A further object of the present invention is to provide a utensil cover which will be adjustable so that it may be used with any type of cooking utensil and the device is such that it will be easily fitted to utensils of various diameters.

Still another object of the present invention is to provide a utensil cover which will provide an excellent means for steaming steaks and chops and the device will be easily cleaned after the steaming or cooking operation.

A still further object of the present invention is to provide a utensil cover which will have all of its component parts replaceable, thus providing easy repair of the device.

Other objects of the invention are to provide a cooking utensil cover bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a fragmentary side view of the present invention, shown partly broken away;

FIG. 2 is a fragmentary bottom plan view of FIG. 1;

FIG. 3 is an enlarged view taken along the lines 3—3 of FIG. 2; and

FIG. 4 is a fragmentary perspective view of the center section of the invention shown in FIG. 2.

Referring now more in detail to the drawing, a cooking utensil cover 10 made in accordance with the present invention is shown to include a hollow, circular shell 12 made of aluminum or other suitable material. Shell 12 is provided with a central opening 14 which receives freely and slidably an elongated aluminum or steel bolt 16 which is threaded at both ends. An internally threaded screw 18 is threadingly received on the upper extremity of bolt 16 and screw 18 is received flush within opening 20 with plastic handle 22. A hollow cylindrical threaded or unthreaded spacer 24 made of aluminum or other suitable material is received over the lower extremity of bolt 16 and its upper end abuts with inner surface 26 of shell 12, and the lower end of spacer 24 abuts against washer 28 which is received on the lower end. Washer 28 abuts which the center of plate 30 of aluminum or other suitable material, and a plurality of lips 32 die stamped through plate 30 are bent toward each other and overlap the square head 34 of bolt 16, thus securing plate 30 to the assembly. A plurality of aluminum tubes 36 are fixedly secured to the edges of plate 30 and thus provide a means for receiving a plurality of smaller diameter tubes made of aluminum or other material. Tubes 38 are fixedly secured within tubes 36 by welding, brazing or other suitable means and tubes 38 are provided with a single, circular opening 40 for the purpose which hereinafter will be described. A pair of U-shaped wires of aluminum or stainless steel 42 are provided with angularly shaped ends 44 which provide support means for the assembly in a utensil. U-shaped wires 42 are provided with a plurality of spaced apart spring loaded balls 46 which lockingly engage within openings 40 of tubes 38, thus providing a variable adjustment means for utensil cover 10 when U-shaped wires 42 are slid in and out of tubes 38.

It will be apparent that bolt 16 is freely received within circular opening 48 through the center of plate 30 and adjustment means for height for utensil cover 10 is provided for by the removal of a particular spacer 24 and replacing it with one of a different length.

It will further be noted that by removing screw 18 from the upper end of bolt 16 the handle 22 may be removed and will thus allow access to bushing 24 for changing the height of the device to any other desired height.

While various changes may be made in the detail construction, it shall be understood that such changes shall be within the spirit and scope of the present invention as defined by the appended claims.

What is claimed is:

1. A cooking utensil cover comprising, in combination, a hollow metallic shell of circular configuration, a plastic handle carried by said shell providing hand grip means for lifting said cover, a flange headed screw carried by said shell providing means for threadingly receiving an elongated bolt having a square head, a threaded spacer of cylindrical configuration carried by said shell of said cover providing height adjustment means for said cover when replaced by one of a different length, a washer and a plate carried by said shell providing a means for securing a plurality of short aluminum tubes carried by said shell and a plurality of elongated tubes and U-shaped wires carried by said shell providing adjustment means for said cover to fit utensils of various diameters, a plurality of spring-loaded balls carried by said shell providing detent locking means for the horizontal adjustment of said U-shaped wires within said elongated tubes.

2. The combination according to claim 1 wherein said bolt is threadingly received within an internally threaded screw which is recessed within a central opening in said handle and said screw securing the main components to said shell of said cover and said bolt is received freely through a central opening in said shell, the lower end of said bolt being threadingly received within an elongated cylindrical bushing and the upper end of said bushing abuts with the inner surface of said shell of said cover.

3. The combination according to claim 2 wherein the lower end of said spacer abuts with the upper surface of said washer and said washer freely receives the lower extremity of said bolt and the other side of said washer abuts with the upper surface of said plate beneath said spacer.

4. The combination according to claim 3 wherein said plate is provided with a plurality of die pressed out lips of rectangular configuration and said lips foldingly embrace and secure the square head of said bolt against the bottom of said plate, thus securing said plate to said shell.

5. The combination according to claim 4 wherein a hollow aluminum tube is secured to the outer and upper edges of said plate by welding or other suitable means and said tubes each receive and are secured to an elongated hollow tube having a circular opening through its wall.

6. The combination according to claim 5 wherein said elongated tubes are secured within said tubes secured to said plate and said elongated tubes provide guide means for said U-shaped wires of aluminum material, and said wires provide horizontal adjustment at four points to correspond to the width of a cooking utensil and the ends of said wires rest upon the bottom surface of said utensil and thus support said cover so that the food within said utensil may be steamed or otherwise cooked in a minimum amount of time with a minimum amount of effort and will further impart a better flavor to said food.

7. The combination according to claim 6 wherein said U-shaped wires provide support means for said device and are further provided with said spring loaded balls which are spaced apart in each arm of said wires and said balls provide detent locking means when they are received within said circular openings in said elongated arms thus securing said wires in any desired position from the center of said cover.

References Cited in the file of this patent
UNITED STATES PATENTS 2,751,901    Livermore _____ June 26, 1956

UNITED STATES PATENT OFFICE

CERTIFICATE OF CORRECTION

Patent No. 3,110,412                                 November 12, 1963

Charles D. Curry, Jr.

It is hereby certified that error appears in the above numbered patent requiring correction and that the said Letters Patent should read as corrected below.

Column 1, line 62, for "which" read -- with --.

Signed and sealed this 21st day of December 1965.

(SEAL)
Attest:

ERNEST W. SWIDER                                EDWARD J. BRENNER
Attesting Officer                                    Commissioner of Patents